April 11, 1967   F. K. H. NALLINGER   3,313,483
THERMOSTAT

Filed June 15, 1964   2 Sheets-Sheet 1

INVENTOR.
FRIEDRICH K. H. NALLINGER
BY Dicke + Craig
ATTORNEYS

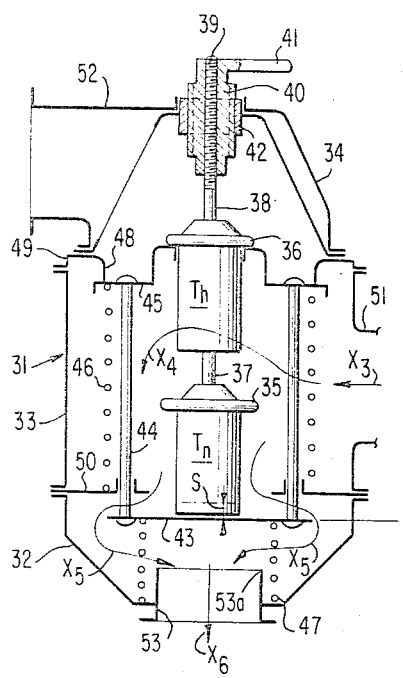
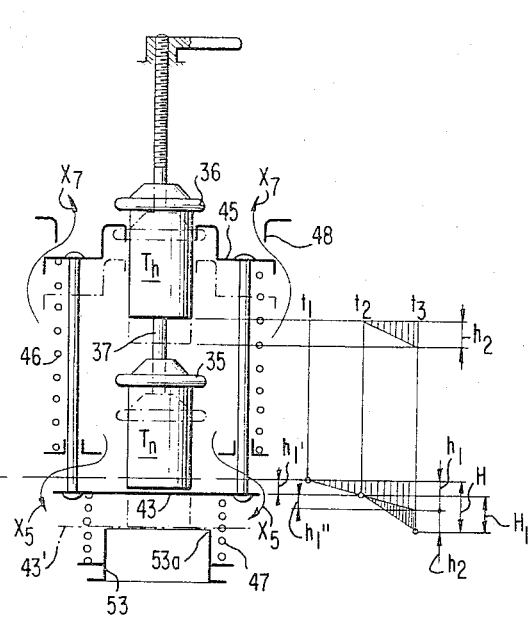
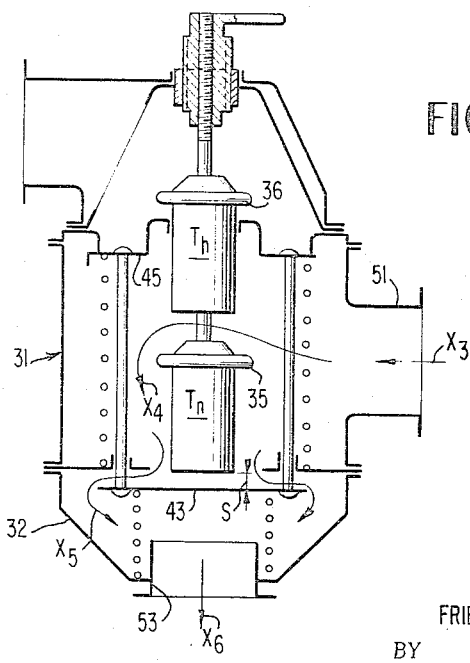

United States Patent Office 3,313,483
Patented Apr. 11, 1967

3,313,483
THERMOSTAT
Friedrich K. H. Nallinger, 5 Albrecht-Durer-Weg,
Stuttgart, Germany
Filed June 15, 1964, Ser. No. 375,200
Claims priority, application Germany, June 20, 1963,
N 23,346
16 Claims. (Cl. 236—34.5)

The present invention relates to a thermostat construction and more particularly to a thermostat for different opening temperatures and/or opening strokes, especially for use in motor vehicle internal combustion engines.

It is customary today to utilize in regions, in which prevail high degrees of coldness during the winter, a so-called winter thermostat in motor vehicle internal combustion engines which has a higher opening temperature than is customary otherwise so that water with higher temperature is available for the heating system of the vehicle. In the following text such thermostats are designated as "high-temperature thermostats" or "winter thermostats" in contrast to the "low-temperature thermostats" or "summer thermostat."

The present invention now aims to enable use of such thermostats by a combination of these thermostats into a unitary aggregate or structure in such a manner that they can be utilized, by a simple change-over, either under climatic conditions with low temperatures; that is, as winter thermostats, or under climatic conditions with higher temperatures, that is, as summer thermostats.

The present invention accordingly consists in that two thermostats which respond differently to temperature influences and are combined into a single thermostatic unit, are adjustably arranged in such a manner that with the occurring temperatures either only the one or the other of the two thermostats exclusively alone or in combination with the other thermostat becomes effective.

This can be achieved in the simplest manner in that two thermostats are installed adjacent one another, each having its own valve, whereby an adjustability of the one or the other or also of both thermostats is so provided that either only the summer or low-temperature thermostat or the winter or high-temperature thermostat becomes effective in dependence on the control or regulating temperature of the cooling medium. The thermostat in question can thereby be suitably adjusted by means of a screw, by means of cams or eccentrics or in any other known manner.

According to a further feature of the present invention, both thermostats act on the same valve in such a manner that with the adjustment of the thermostats or of one of the thermostats, that particular one of the two thermostats which becomes ineffective thereby receives a play in the direction of expansion with respect to the valve. Both thermostats may be arranged adjacent one another, preferably, however, coaxially to one another so that they form a relatively narrow or small unit or aggregate and separate transmission members such as levers or the like can be dispensed with. Especially in the case of the coaxial arrangement, the thermostats may furthermore be operatively connected in series one behind the other.

An appropriate construction of the thermostatic unit results if both thermostats are arranged on the inlet or supply side of the valve, especially in such a manner that the valve is slidingly supported on the thermostat adjacent the adjustable bearing place of the unit, and the thermostat remote from the bearing place actuates the valve whereby by adjustment of the thermostatic unit an idling stroke is adapted to be established at the bearing place between the zero or closing position of the valve and the moment of opening of the valve. In the latter case, the thermostatic unit opens the valve only with a higher inflow or supply temperature of the liquid, and the unit acts as high-temperature or winter thermostat.

Since the low and high temperature thermostats respond only at different temperatures, with a seriatim arrangement of the thermostats—after the response of only the one thermostat—initially only a relatively slow stroke movement of the thermostatic unit acting on the valve takes place until the second thermostat also responds or becomes operative whereupon the strokes of both thermostats add and a relatively rapid movement takes place acting on the valve. The stroke velocity of the thermostatic unit can therefore be graduated or increased compared to a single thermostat, which is desirable oftentimes for the increased effectiveness of the temperature control.

According to a special type of construction of the thermostatic unit in accordance with the present invention, only one of the two thermostats is arranged on the inlet side of the valve. This has as consequence that the other thermostat, not directly exposed to the temperature of the inlet side, is rendered operative or becomes effective practically only after the opening of the valve by the first-mentioned thermostat arranged on the inlet side. Either the low-temperature or the high-temperature thermostat may thereby be arranged on the inlet side of the valve. By reason of the axial adjustability of the unit in such a manner that a play exists between the thermostatic unit and the valve, it is possible to so adjust the unit that it acts on the valve during summer already with a lower temperature, whereas it acts on the valve during the winter only at a higher temperature. The thermostat arranged behind the valve remains thereby uninfluenced for such length of time until the valve has opened and thus gives access to the cooling medium also to the thermostat arranged behind the valve whereupon the valve opens with increased stroke velocity.

With adjustment of the unit to summer operation, the play between the unit and the valve is eliminated so that the valve, insofar as the low-temperature or summer thermostat is arranged on the inlet side, is opened instantaneously with commencing expansion thereof whereupon by reason of the inflow of the warmer cooling medium to the high-temperature or winter thermostat also the latter thermostat is made to respond or becomes operable almost instantaneously and in conjunction with the low-temperature thermostat opens the valve in an accelerated manner to a large flow cross section.

The adjustment of the thermostatic unit to its respective zero setting position can take place directly at the thermostat or at its bearing in the housing for example, by an inwardly or outwardly disposed thread or screw, an eccentric, a toggle or the like. The adjustment can also take place by a remote control, for example, from the driver seat, for instance, by means of a Bowden cable, by a mechanical, an electrical, a hydraulic or other linkage or the like. Furthermore, the adjustment can also take place automatically, for example, in dependence on the temperature of the exhaust air of the radiator.

Accordingly, it is an object of the present invention to provide a thermostatic unit which is simple in construction, easy to adjust, yet capable of operating effectively under differing temperature conditions.

It is another object of the present invention to provide a thermostat, especially for controlling the cooling liquid of an internal combustion engine in motor vehicles, which obviates the aforementioned shortcomings and drawbacks encountered with the prior art constructions in an effective and operationally reliable manner.

Still another object of the present invention resides in the provision of a thermostat unit which is capable of functioning both as winter and summer thermostat and which may be easily switched from one to the other.

A further object of the present invention resides in the provision of a thermostatic unit achieving the aims and objects mentioned above which is compact in dimensions, obviates the need for separate transmission members, yet permits an accurate adjustment of the thermostat to different temperature conditions.

These and other objects, features and advantages of the present invention will become more obvious from the following description when taken in connection with the accompanying drawing which shows, for purposes of illustration only, several embodiments in accordance with the present invention, and wherein FIGURE 1 is a somewhat schematic, cross-sectional view through a thermostat unit with two thermostats arranged adjacent one another in accordance with the present invention which are operable to actuate alternately one and the same valve;

FIGURE 2 is a somewhat schematic, cross-sectional view through a modified embodiment of a thermostat unit having coaxially arranged thermostats operatively connected one behind the other, whereby both thermostats are arranged on the inlet side of the valve, and more particularly illustrating the adjustment of the thermostat unit to a low opening temperature or summer operation at the moment the thermostatic unit begins to respond;

FIGURE 3 is a schematic cross-sectional view of the thermostat unit of FIGURE 2 with the same adjustment, however, after the unit has started to respond and after the opening of the valve has begun (full lines) as well as with a fully opened valve (indicated in dash and dot lines);

FIGURE 4 is a schematic cross-sectional view through the thermostat unit of FIGURES 2 and 3, however, with the adjustment thereof to a higher opening temperature or winter operation, and more particularly in the zero setting position of the unit with a closed valve;

Figure 5:
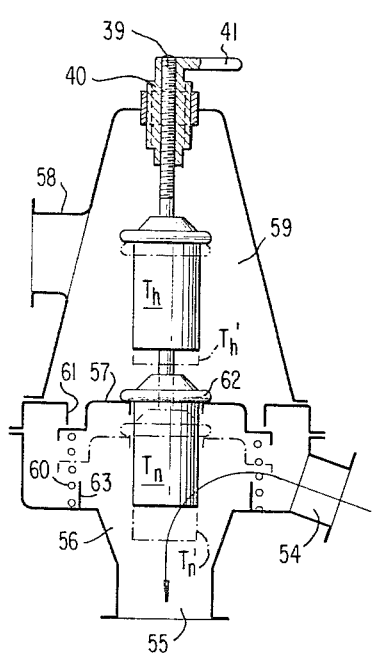
Figure 6:
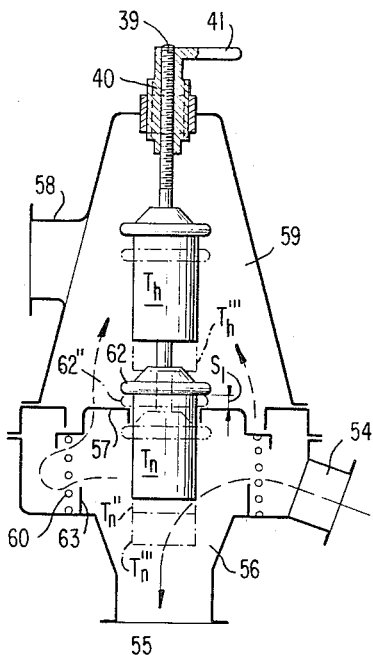

FIGURE 5 is a schematic cross-sectional view of a still further modified thermostat unit in accordance with the present invention with only one of the thermostats exposed to the inflowing medium, and more particularly with the adjustment thereof to a low opening temperature or summer operation, and FIGURE 6 is a schematic cross-sectional view through the thermostat unit of FIGURE 5, however, with the adjustment thereof to a higher opening temperature or winter operation.

Figure 1:
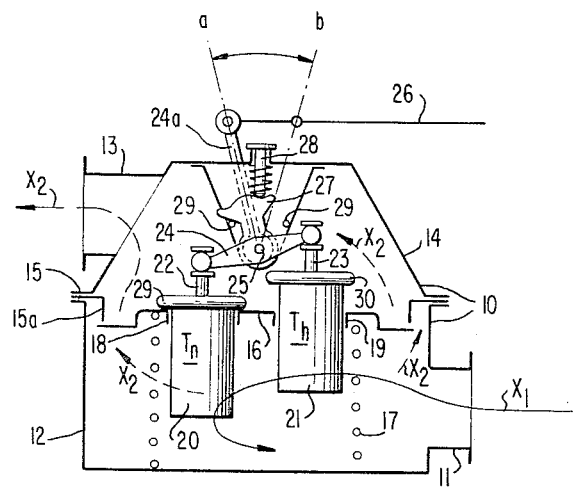

Referring now to the drawing wherein like reference numerals are used throughout the various views to designate like parts, and more particularly to FIGURE 1, reference numeral 10 designates therein the thermostat housing into which flows in the direction of arrow $x_1$ a heated medium for example, the cooling water of the internal combustion engine driving a motor vehicle, through the connecting piece 11 arranged in the lower housing part 12 whereas the regulated or controlled medium 12 is able to leave through an outlet connecting piece 13 in the upper housing part 14 toward the outside, for example, toward the radiator of the vehicle. A partition wall 15 is inserted between the lower housing part 12 and the upper housing part 14 which forms simultaneously the valve seat 15a for a valve 16. The valve 16 is forced by a spring 17 against its valve seat 15a. Two thermostats, and more particularly a low-temperature or summer thermostat $T_n$ and a high-temperature or winter thermostat $T_h$ are slidably guided in two apertures 18 and 19 of the valve 16. Both thermostats are pivotally connected with a two-armed lever 24 by means of the adjustable control pins 22 and 23 thereof which are adjusted upon response to the corresponding temperature relative to the respective thermostat bodies 20 and 21. The two-armed lever 24 is pivotally supported on a pin 25 in the upper housing part 14 and is adapted to be pivoted manually by a lever arm 24a either directly or by way of a linkage 26 or the like from a position $a$ into a position $b$. For securing the lever 24 in one or the other position $a$ or $b$, a detent mechanism is provided in an appropriate manner. In the illustrated embodiment, a cam 27 provided with detents is rigidly connected for this purpose with the lever 24. A detent pin 28 which is under spring pressure is able to engage into the detents of the cam 27 in the one or the other end position thereof determined, for example, by the two abutments 29.

As can be readily seen from the drawing, in the position $a$ of the lever arm 25, the low-temperature thermostat $T_n$ is adjusted to respond and actuate the valve 16 and thus determines the summer operation of the thermostat. Upon reaching a relatively low temperature, for example, between 70° C. to 80° C., the thermostat $T_n$ expands and takes along by means of its collar 29 the valve 16, whereby the valve 16 opens and permits the cooling medium to pass in the direction of arrow $x_2$ through the valve cross section so that the cooling medium is able to flow off through the connecting piece 13 to the radiator (not shown). The cooling water is therefore subjected already at a relatively low temperature to the cooling effect of the radiator.

If the lever arm 25 is brought into the position $b$, then the high-temperature thermostat $T_h$ becomes operative. Though also in this case the low-temperature thermostat $T_n$ initially responds, the low-temperature thermostat $T_n$, however, cannot open the valve 16 since its collar 29 is at a distance from the valve 16 and therefore carries out the expansion stroke without effect. In contrast thereto, the high-temperature thermostat $T_h$ acts immediately at the moment of its response on the valve 16 in that it lifts the valve 16 off the valve seat 15a thereof by means of its collar 30.

The thermostats $T_n$ and $T_h$ may be constructed, as also in all the other embodiments described herein, in any suitable known and conventional manner. They may be constructed as bellows-like boxes, or as is customary today, may operate with different filling masses, for example, wax masses having differently high melting temperatures and possibly different coefficients of expansion so that not only the response temperature but also the opening stroke are differently large within predetermined temperature intervals.

In the embodiment of FIGURES 2 to 4, the two thermostats $T_n$ and $T_h$ are again arranged within a housing generally designated by reference numeral 31, which in this case consists for example of three main parts, 32, 33 and 34, the thermostats being installed as low-temperature thermostat $T_n$ with a collar 35 and as high-temepraature thermostat $T_h$ with a collar 36. The low-temperature thermostat $T_n$ is thereby securely connected by means of its adjusting pin 37 to the thermostatic body of the high-temperature thermostat $T_h$ which in turn is connected by means of its adjusting pin 38 with a threaded spindle 39 which is threaded into a threaded bushing or sleeve 40 having a handle 41 and provided with internal and external threads. The threaded bushing 40 may be screwed by means of the outer thread thereof into a threaded bearing 42 or also may be only rotatably supported in a corresponding bearing whereas the thermostat unit consisting of the thermostats $T_n$ and $T_h$ is secured against rotation in relation to the housing. Possibly also the unit together with the spindle 39 may be securely connected with the threaded bushing 40. In case the threaded bushing 40 is provided with internal and external threads, the threads can be constructed of different pitch and/or as right and left-hand threads.

The lower one of the two thermostats $T_n$ and $T_h$ series-connected one behind the other in this manner acts with the lower end surface thereof against a cross traverse or cover plate 43 which is connected by means of tension members, for example, in the form of stay-bolts 44, with the valve 45 which is forced under the effect of a spring 46 and/or of a spring 47 against the valve seat 48 of a partition wall 49.

The tension members or spacer bolts 44 are thereby guided in apertures or guide-eyes of a further housing cross wall 50 which also may serve for the support of the possibly provided valve spring 46.

In contrast to the embodiment of FIGURE 1, the embodiment according to FIGURES 2 and 4 serves for the control of a cooling water system with a controlled by-pass or short-circuiting line by-passing the radiator (not shown). For this purpose, the housing 31 is provided with an inlet connecting piece 51, with an outlet connecting piece 52 leading to the radiator (not shown) and with a connecting piece 53 leading to the by-pass line (not shown). The connecting piece 51 is arranged in the center part 33 of the housing 31, the connecting piece 52 in the upper part 34 of the housing 31, and the connecting piece 53 in the lower part 32 of the housing 31. The connecting piece 53 may simultaneously serve as valve seat for the cover plate 43 in that it projects with the upper end 53a thereof into the lower housing chamber and the cover plate 43 is constructed as valve.

The operation of the thermostat unit of FIGURE 4 is believed obvious from FIGURES 2 to 4 of the drawing. In FIGURE 2 the unit is in the zero setting position and more particularly is adjusted to summer operation.

The thermostats $T_h$ and $T_n$ which are axially connected with each other and are operatively connected one behind the other, are in the lowermost position thereof in which the lower end face of the thermostat $T_n$ abuts against the cover plate 43 or nearly abuts thereagainst in such a manner that the valve 45 rests against the valve seat 48 under the effect of the springs 46 and/or 47. While the collar 36 of the thermostat $T_h$ is almost able to contact the valve 45, it is, however, not able to open the same in the adjusted position.

If heated cooling liquid flows in from the engine in the direction of the arrow $x_3$, then the cooling liquid flows around both thermostats $T_h$ and $T_n$ in the directions of arrows $x_4$ and $x_5$ whereby the cooling liquid is able to flow off in the direction of arrow $x_6$ into the by-pass line by-passing the radiator whereas the discharge of the cooling liquid to the radiator by way of the connecting piece 52 is blocked or closed.

By reason of the heating-up of the thermostats $T_h$ and $T_n$, at first the low-temperature thermostat $T_n$ responds and operates in that it begins to expand and thereby lifts the valve 45 from the seat 48 thereof by means of the cover plate 43 and the stay-bolts 44. It is assumed, as an example, that the temperature $t_1$, for instance 75° C., is the response or operating temperature of the low-temperature thermostat $T_n$ and that the temperature $t_2$, for instance 85° C., is the response or operating temperature of the high-temperature thermostat $T_h$. Additionally, it is assumed that by appropriate conventional means, the coefficient of expansion of the high-temperature thermostat $T_h$ is greater than the coefficient of expansion of the low-temperature thermostat $T_n$, as is illustrated in the diagram adjacent FIGURE 3. Consequently, the low-thermostat temperature $T_n$ will initially expand between the temperatures $t_1$ and $t_2$ by a stroke $h_1'$ with relatively slight opening velocity so that the valve 45 opens only relatively slowly and therewith frees the path to the radiator in the direction or arrow $x_7$ (FIGURE 3). As soon as the high temperature thermostat $T_h$ also responds at the temperature $t_2$, the expansion strokes of both thermostats add so that, for example, up to the end temperature $t_3$ with a stroke $h_1 = h_1' + h_1''$ of the low-temperature thermostat $T_n$ and of a stroke $h_2$ of the high-temperature thermostat $T_h$ a total opening stroke H of the valve 45 is achieved. In the illustrated embodiment, this stroke H is so selected that at the end thereof the cover plate 43 constructed as a valve rests against the upper end of the connecting piece 53 serving as valve seat 53a in the position indicated in dash and dot lines and designated by reference numeral 43' and thus prevents the outflow of the cooling water into the by-pass lines by-passing the radiator. Consequently, the entire cooling liquid flows through the vehicle radiator and can be cooled thereat intensively.

For winter operation the thermostats are adjusted into an upper zero position corresponding to FIGURE 4. Neither of the two thermostats then acts in this case immediately on the valve 45 or on the cover plate 43 during the respective response thereof. Instead, the thermostat $T_n$ or the two thermostats have to expand initially by a stroke $s$ before the thermostat $T_n$ reaches the cover plate 43 and thereafter opens in conjunction with the thermostat $T_h$ the valve 45 by means of the cover plate 43. If this stroke $s = h_1'$, then the valve 45 would open exactly at a temperature $t_2$ whereas at the end temperature $t_3$, the valve would have carried out a stroke $H_1 = H - h_1'$. The connection with the by-pass line by way of the connecting piece 53 remains in effect, in this case, also at the temperature $t_3$.

Thus, with the use of conventional thermostats having expansion strokes $h_1$ or $h_2$ a considerably greater opening stroke and opening cross section can be achieved also with relatively slight changes in temperature.

Possibly also, insofar as the presently customary commercial construction of the thermostats is given up, both thermostats can be replaced by a single thermostat with correspondingly dimensioned coefficient of expansion. Such a thermostat can also operate with separate fillings or may also be filled with a mixture of two filling masses that respond to different temperatures.

In the embodiments of FIGURES 5 and 6, the two thermostats $T_n$ and $T_h$ are again arranged coaxially to one another and may, as in the preceding embodiment, be axially adjusted together by means of the threaded spindle 39 and the adjusting bushing 40 provided with the handle 41. In contrast to the preceding embodiment, however, only the low-temperature thermostat $T_n$ is arranged in the inlet space 56 exposed to the inflowing stream of the cooling water entering through the connecting piece 54 and flowing off through the connecting piece 55 into the by-pass line. The inlet space 56 is thereby separated by the valve 57 against the space 59 in communication with the connecting piece 58 which leads to the radiator (not shown). A spring 60 presses the valve 57 against its valve seat 61.

In FIGURE 5, the thermostat unit $T_n/T_h$ is adjusted to summer operation and is in the zero or off position thereof. As soon as the temperature is reached at which the low-temperature thermostat $T_n$ responds or operates, the latter begins to expand and thereby opens the valve 57, and more particularly, initially with relatively slow movement until a temperature is reached at which the higher response temperature of the high temperature thermostat $T_h$ is also attained in the space 59 behind the valve 57. At that moment, both thermostats expand together in unison and thus effect a relatively high opening velocity of the valve 57. FIGURE 5 shows an intermediate position $T_h'$ and $T_n'$ of the two thermostats.

In FIGURE 6 is illustrated the adjustment of the thermostat unit to winter operation. When the response temperature of the low-temperature thermostat $T_n$ is reached, the thermostat $T_n$ disposed within the stream of the heated cooling water begins to expand, however, does not yet actuate the valve 57 by reason of the play $s_1$ between the collar 62 of the thermostat $T_n$ and the valve 57 which is slidingly supported on the thermostat $T_n$. Only upon further temperature increase, which corresponds for example, to the response temperature of the high-temperature thermostat $T_h$, the thermostat $T_n$ opens by means of its collar 62, for example, in the position 62" thereof, the valve 57 in that the low-temperature thermostat in the position $T_n''$ lifts the valve 57 against the effect of the spring 60 from its seat 61. Since now the heated cooling liquid can also pass over into the space 59, the high temperature thermostat $T_h$ heretofore uninfluenced is also rendered operative as soon as the temperature of the cooling water in the space 59 exceeds the response temperature of the thermostat.

Thus, both thermostats together act or become effective in unison so that the valve can now open further very rapidly (positions $T_n'''$ and $T_h'''$ of the thermostats).

The by-pass line 55 is also controlled in the illustrated embodiment of FIGURES 5 and 6 in that, for example, a pipe extension 63 serving as second valve seat for the valve 57 is provided within the space 56 against which rests the valve 57 at the end of its downward stroke. Possibly also the low-temperature thermostat $T_n$ itself may serve as control element in that it closes at the end of its stroke either itself or by means of an additional valve arranged at the lower end face thereof, the line cross section of the housing connecting piece 55.

Possibly the control of the by-pass line by means of the thermostat unit may also be dispensed with in all cases.

Moreover, in the embodiments of FIGURES 2 to 4 or 5 and 6 two identical thermostats, especially two low-temperature thermostats may be series connected one behind the other in that the control of the response temperature takes place by changing the axial play between thermostat and valve. Furthermore, in the construction according to FIGURES 5 and 6, the thermostat $T_h$ may possibly also be arranged at the inflow side and the thermostat $T_n$ in the space 59, that is, the thermostats thus are interchanged with one another.

In this case, at first only the high-temperature thermostat would respond so that the engine is brought rapidly to a high temperature for the effective heating thereof, especially also for warming up the lubricating oil. In winter operation, if with lower outside temperature less cooling output is required by reason of snow and ice, practically only the high-temperature thermostat would operate because the low-temperature thermostat located behind the valve would be exposed to an insufficient flow of hot water. However, the low-temperature thermostat would be operable also during the summer and under certain circumstances would determine the control because very much more water flows through the valve gap and brings the low-temperature thermostat to respond or operate.

With a construction according to FIGURES 5 and 6, inclusive the aforementioned modifications thereof, an idling stroke need not be provided between the thermostats and the controlled valve. The adjustment can then be made in such a manner that in summer operation always a valve gap remains open at the controlled valve.

While I have shown and described several embodiments in accordance with the present invention, it is understood that the same is not limited thereto, but is susceptible of numerous changes and modifications as known to a person skilled in the art. For example, as with the first-described embodiments, the thermostats can also be combined into a single unit with the last-described modifications in that, for example, the fillings are provided separate or mixed with each other. An adjustability of the thermostats and possibility of freedom of movement thereof in relation to the control valve is necessary in that case.

Thus, while I have shown and described several embodiments in accordance with the present invention, it is understood that the same is not limited thereto, but is susceptible of numerous changes and modifications as known to a person skilled in the art; and I therefore do not wish to be limited to the details shown and described herein, but intend to cover all such changes and modifications as are encompassed by the scope of the appended claims.

I claim:

1. A thermostat structure, especially for controlling the cooling water temperature of motor vehicle internal combustion engines, comprising:
   first thermostat means,
   second thermostat means,
   said first and second thermostat means responding differently to temperature influences,
   and means operatively combining said first and second thermostat means into a thermostat unit including adjusting means for adjusting said thermostat means in such a manner that with the occurring temperatures either only the one or at least the other of said thermostat means or both thermostat means in combination with one another become effective,
   a housing having a fluid inlet and a fluid outlet, valve means for controlling the flow of fluid from said inlet to said outlet, said valve means including a relatively stationary seat and a movable valve member having generally reciprocating movement between an open position and a closed position generally axially of said valve seat, said first and second thermostat means being mounted within said housing and being connected together for movement relative to said movable valve member between a summer position and a winter position, said first thermostat means moving said movable valve member between its open position and closed position in response to a temperature change within a predetermined desired temperature range when said first thermostat means is in its summer position, said adjusting means jointly moving both of said thermostat means generally axially relative to said movable valve member between said summer position and said winter position, and said adjusting means extending outside of said housing for adjustment from outside of said housing to effectively change the temperature range within which said valve means is operated.

2. A thermostat structure according to claim 1,
said adjusting means being operable to selectively adjust the thermostat means into a position each in which the respective thermostat means opens said valve means in such a manner that said valve means is opened either at a lower temperature by one of said thermostat means constituting the low-temperature thermostat or at a higher temperature by the other thermostat means constituting the high-temperature thermostat whereas the respective other thermostat means remains at least partially ineffectual.

3. A thermostat structure according to claim 2,
both thermostat means are operatively connected with the valve means to act upon the same valve means in such a manner that with the adjustment of the two thermostat means, the thermostat means which is ineffectual has a play in the expansion direction with respect to the valve means.

4. A thermostat unit according to claim 1,
both thermostat means being operatively connected one behind the other and being adjustable as a unit whereby they act together on said valve means.

5. A thermostat unit according to claim 4,
both thermostat means being arranged coaxially to one another.

6. A thermostat unit, especially for controlling the cooling water temperature of motor vehicle internal combustion engines, comprising:
   a first thermostat means,
   second thermostat means,
   said first and second thermostat means responding differently to temperature influences,
   and means operatively combining said first and second thermostat means into a thermostat unit including adjusting means for adjusting said thermostat means in such a manner that with the occurring temperatures either only the one or at least the other of said thermostat means or both thermostat means in conjunction with one another become effective,
   and valve means having an inlet side and acted upon by said thermostat means for controlling the flow of cooling medium, and both thermostat means being operatively connected one behind the other and being adjustable as a unit whereby they act together on said valve means, and support means in the structure for the thermostat means and forming a bearing place, both of said thermostat means being arranged on the inlet side of the valve means, in such a manner that the valve means is slidingly supported on the thermostat means adjacent said bearing place and the thermostat means remote from said bearing place actuates said valve means, whereby upon adjustment of the thermostat means by said adjusting means an idling stroke between the normal position of said thermostat means and the moment of opening of the valve means is adapted to be established.

7. A thermostat unit, especially for controlling the cooling water temperature of motor vehicle internal combustion engines, comprising:

first thermostat means, second thermostat means, said first and second thermostat means responding differently to temperature influences, and means operatively combining said first and second thermostat means into a thermostat unit including adjusting means for adjusting said thermostat means in such a manner that with the occurring temperatures either only the one or at least the other of said thermostat means or both thermostat means in conjunction with one another become effective, and valve means having an inlet side and acted upon by said thermostat means for controlling the flow of cooling medium, and both thermostat means being operatively connected one behind the other and being adjustable as a unit whereby they act together on said valve means, and support means in the structure for the thermostat means and forming a bearing place, both of said thermostat means being arranged on the inlet side of the valve means, in such a manner that the valve means is slidingly supported on the thermostat means adjacent said bearing place and the thermostat means remote from said bearing place actuates said valve means, whereby upon adjustment of the thermostat means by said adjusting means an idling stroke between the normal position of said thermostat means and the moment of opening of the valve means is adapted to be established, and cover plate means, connecting means operatively connecting said cover plate means with said valve means, and spring means urging said valve means in the closing position thereof, the thermostat means remote from the adjustable bearing place acting on said cover plate means and lifting off said valve means against the effect of the spring means.

8. A thermostat unit according to claim 4, said valve means including a main valve valving a first line and a further valve operatively connected with said main valve and valving a second line in such a manner that with the opening movement of one valve a closing movement of the other valve takes place and vice versa.

9. A thermostat unit, especially for controlling the cooling water temperature of motor vehicle internal combustion engines, comprising:

first thermostat means, second thermostat means, said first and second thermostat means responding differently to temperature influences, and means operatively combining said first and second thermostat means into a thermostat unit including adjusting means for adjusting said thermostat means in such a manner that with the occurring temperatures either only the one or at least the other of said thermostat means or both thermostat means in conjunction with one another become effective, and valve means having an inlet side and acted upon by said thermostat means for controlling the flow of cooling medium, both thermostat means being arranged coaxially to one another, and both thermostat means being operatively connected one behind the other and being adjustable as a unit whereby they act together on said valve means, and support means in the structure for the thermostat means and forming a bearing place, both of said thermostat means being arranged on the inlet side of the valve means, in such a manner that the valve means is slidingly supported on the thermostat means adjacent said bearing place and the thermostat means remote from said bearing place actuates said valve means, whereby upon adjustment of the thermostat means by said adjusting means an idling stroke between the normal position of said thermostat means and the moment of opening of the valve means is adapted to be established, and cover plate means, connecting means operatively connecting said cover plate means with said valve means, and spring means urging said valve means in the closing position thereof, the thermostat means remote from the adjustable bearing place acting on said cover plate means and lifting off said valve means against the effect of the spring means, said valve means including a main valve valving a first line and a further valve operatively connected with said main valve and valving a second line in such a manner that with the opening movement of one valve a closing movement of the other valve takes place and vice versa.

10. A thermostat unit, especially for controlling the cooling water temperature of motor vehicle internal combustion engines, comprising:

first thermostat means, second thermostat means, and means operatively combining said first and second thermostat means into a thermostat unit including adjusting means for adjusting said thermostat means in such a manner that with the occurring temperatures either only the one or at least the other of said thermostat means or both thermostat means in conjunction with one another become effective, and valve means having an inlet side and acted upon by said thermostat means for controlling the flow of cooling medium, only one of the two thermostats being arranged on the inlet side of the valve means so that the other thermostat means is rendered effective only with delay, said adjusting means to selectively adjust said thermostat means relative to said valve means to render said thermostat means inoperative to act upon said valve means until after said thermostat means has operated a specific amount related to the adjustment of said thermostat means relative to said valve means.

11. A thermostat unit, especially for controlling the cooling water temperatures of motor vehicle internal combustion engines, comprising:

first thermostat means, second thermostat means, said first and second thermostat means responding differently to temperature influences, and means operatively combining said first and second thermostat means into a thermostat unit including adjusting means for adjusting said thermostat means in such a manner that with the occurring temperatures either only the one or at least the other of said thermostat means or both thermostat means in conjunction with one another become effective, and valve means having an inlet side and acted upon by said thermostat means for controlling the flow of cooling medium, both thermostat means being adjustable as a unit whereby they act together on said valve means, only one of the two thermostats being arranged in the inlet side of the valve means so that the other thermostat means is rendered effective only with delay after the opening of the valve means by the first-mentioned thermostat means connected in series with the second-mentioned thermostat means.

12. A thermostat unit, especially for controlling the cooling water temperature of motor vehicle internal combustion engines, comprising:

first thermostat means, second thermostat means, said first and second thermostat means responding differently to temperature influences, and means operatively combining said first and second thermostat means into a thermostat unit including adjusting means for adjusting said thermostat means in such a manner that with the occurring temperatures either only the one or at least the other of said thermostat means or both thermostat means in conjunction with one another become effective, and valve means having an inlet side and acted upon by said thermostat means for controlling the flow of cooling medium, only one of the two thermostats being arranged on the inlet side of the valve means so that the other thermostat means is rendered effective only with delay, the low-temperature thermostat means being disposed in front of and the high-temperature thermostat means being disposed behind the control valve means.

13. A thermostat unit, especially for controlling the cooling water temperature of motor vehicle internal combustion engines, comprising:

first thermostat means, second thermostat means, said first and second thermostat means responding differently to temperature influences, and means operatively combining said first and second thermostat means into a thermostat unit including adjusting means for adjusting said thermostat means in such a manner that with the occurring temperatures either only the one or at least the other of said thermostat means or both thermostat means in conjunction with one another become effective, and valve means having an inlet side and acted upon by said thermostat means for controlling the flow of cooling medium, only one of the two thermostats being arranged on the inlet side of the valve means so that the other thermostat means is rendered effective only with delay, the high-temperature thermostat means being disposed in front of and the low-temperature thermostat means being disposed behind the control valve means.

14. A thermostat unit, especially for controlling the cooling water temperature of motor vehicle internal combustion engines, comprising:

first thermostat means, second thermostat means, said first and second thermostat means responding differently to temperature influences, and means operatively combining said first and second thermostat means into a thermostat unit including adjusting means for adjusting said thermostat means in such a manner that with the occurring temperatures either only the one or at least the other of said thermostat means or both thermostat means in conjunction with one another become effective, and valve means having an inlet side and acted upon by said thermostat means for controlling the flow of cooling medium, only one of the two thermostats being arranged on the inlet side of the valve means so that the other thermostat means is rendered effective only with delay, the valve means being operatively connected with lost-motion with the thermostat means arranged on the inlet side of the valve means said adjusting means to selectively eliminate the lost motion.

15. A thermostat structure according to claim 1, including remote control means for controlling said thermostat means from the driver seat.

16. The thermostat unit of claim 1 wherein the thermostat means possess different coefficients of expansion.

References Cited by the Examiner

UNITED STATES PATENTS

| | | | |
|---|---|---|---|
| 1,711,901 | 5/1929 | Nelson | 236—34 |
| 2,128,274 | 8/1938 | Vernet. | |
| 2,137,136 | 11/1938 | Giesler | 236—34 |
| 2,268,083 | 12/1941 | Rapuano | 236—34 |
| 2,396,138 | 3/1946 | Vernet | 236—34 X |
| 2,733,864 | 2/1956 | Rivers | 236—34 |
| 2,754,062 | 7/1956 | Von Wangenheim | 236—34.5 |
| 2,816,711 | 12/1957 | Woods | 236—34 |
| 2,833,478 | 5/1958 | Middleton | 236—34 |
| 3,088,672 | 5/1963 | Simpson | 236—12 |

OTHER REFERENCES

German application 1,087,406, August 1960.

EDWARD J. MICHAEL, *Primary Examiner.*